UNITED STATES PATENT OFFICE 2,208,598

ALIPHATIC AMINO-NITRILES AND PROCESS OF PRODUCING THEM

George W. Rigby, Wilmington, Del., assignor to E. I. du Pont de Nemours & Company, Wilmington, Del., a corporation of Delaware No Drawing. Application September 24, 1938, Serial No. 231,507

9 Claims. (Cl. 260—464)

This invention relates to omega-aminonitriles containing at least 5 carbon atoms between the functional groups and to methods for their preparation. Specifically this invention relates to omega-aminonitriles containing at least 5 carbon atoms between functional groups and to catalytic processes for their preparation from the corresponding aliphatic dinitriles. Still more specifically it relates to the hydrogenation of aliphatic dinitriles containing at least 4 carbon atoms between the functional groups, wherein the hydrogenation is so controlled as to produce the corresponding aminonitriles as the major products of the reaction.

This invention has as an object to provide new aminonitriles containing at least 5 carbon atoms between the functional group, and also to provide catalytic processes for their preparation. A further object is to provide an economical and practical method for the production of omega-aminonitriles containing at least 5 carbon atoms between the functional groups from the corresponding aliphatic dinitriles. Other objects will appear hereinafter.

The above and other objects appearing hereinafter are accomplished by the following invention which in its general aspects comprises heating the aliphatic dinitrile to be converted in the presence of a hydrogenation catalyst such as a metal from the ferrous metal group with hydrogen at an elevated temperature and pressure, and suspending the hydrogenation at such a point that only one of the nitrile groups in the original compound is reduced to an amino group.

The following examples illustrate the preferred embodiments of the invention and are submitted for purposes of illustration and not as limiting the invention.

Example I

Two thousand parts of purified sebaconitrile (prepared in accordance with the process described in the co-pending application of Lazier Serial No. 75,549, filed April 21, 1936) together with 900 parts of liquid ammonia and 200 parts of a nickel-on-alumina catalyst were placed in a suitable pressure vessel and heated to 120° C. under 2,000 lbs./sq. in. of hydrogen pressure. The hydrogen absorption was rapid and in 0.7 hour the theoretical amount of hydrogen to reduce one of the nitrile groups to an amino group according to the following equation

had been taken up. The autoclave was cooled, the product dissolved in methanol, filtered, and distilled through a 14-transfer unit column. After removing the decamethylene imine (B. P. 72° C. at 10 mm.) and decamethylene diamine (B. P. 140° C. at 12 mm.) the omega-aminocaprinitrile (B. P. 170° C. at 10 mm.) was collected as a colorless, slightly viscous oil. This material boiled at 104° C. at 0.33 mm. and at 100° C. at 0.25 mm. The product had a neutral equivalent of 169 (theory 168.3), refractive index $$n_D^{25} 1.4540$$

and a density $$d_4^{25} 0.8785$$

The yield of omega-aminocaprinitrile was 20% of theory.

Analysis gave: carbon, 71.43; hydrogen, 11.57; nitrogen, 17.18, 17.03.

$C_{10}H_{20}N_2$ requires carbon, 71.37; hydrogen, 11.97; nitrogen, 16.65.

Example II

One hundred parts of adiponitrile (prepared according to the process described in the application of W. A. Lazier, Serial No. 133,275, filed March 26, 1937, by passing the vapors of adipic acid together with ammonia over silica gel at 350° C. and purified by fraction distillation) together with 75 parts of liquid ammonia and 8 parts of a modified nickel-on-alumina catalyst were placed in a suitable pressure vessel. Hydrogenation was accomplished by heating the mixture to 120° C. under about 2,000 lbs./sq. in. of hydrogen pressure during 1 hour. The mixture was then cooled, the catalyst filtered off, and the amines purified by distillation. After removal of the slight amount of methanol used as a solvent for washing the catalyst, about one part of material boiling between 130° and 140° C. was obtained. The fraction having a boiling point of 96° to 99° C. at 27 mm. pressure consisted of hexamethylene diamine and amounted to 24 parts. The main fraction boiling at 126° C. at 27 mm. pressure amounted to 56 parts and consisted of pure 6-aminocapronitrile having a refractive index $$n_D^{25} 1.4488$$

a density $$d_{25}^{25} 0.9071$$

a neutralization equivalent of 112.24, 112.30 (theory 112.16). The yield of 6-aminonitrile is 52% of theoretical.

Analysis gave: carbon, 64.75; hydrogen, 10.30; nitrogen, 25.10.

$C_6H_{12}N_2$ requires: carbon, 64.25; hydrogen, 10.78; nitrogen, 24.97.

Although certain definite conditions of time, temperature, pressure and amount of catalyst have been indicated in the above examples, it will be apparent that these values may be varied within wide limits within the scope of this invention. The success of the process depends upon the control of the hydrogenation reaction which may be accomplished in several ways as, for example, by the careful control of the time of hydrogenation, of the pressure and temperature conditions, and by proper selection of the catalyst.

In general, the process of this invention is operable at temperatures ranging from 25° to 200° C. and at pressures ranging from atmospheric to a maximum determined by the practical limitations of the vessel used in carrying out the reaction. It is advisable when working in the liquid phase to maintain a pressure higher and a temperature lower than the corresponding values for ammonia. In this connection it may be noted that the vapor pressure of ammonia at 50° C. is 15,000 mm. (19.75 atmospheres or 290 lbs./sq. in.). Pressures in excess of 290 lbs./sq. in. should therefore be used, when operating in the liquid phase, and for practical purposes pressures ranging from 500 to 4,000 lbs./sq. in. are desirable. It is preferred to operate the process in the liquid phase in the presence of ammonia at temperatures from about 90° to 130° C. and under a total pressure of 1200 to 2600 lbs./sq. in. The quantity of ammonia used may be varied considerably but it is preferred to use at least 25 parts by weight of ammonia per 100 parts by weight of nitrile. The process, however, is operable in the vapor phase in the absence of ammonia at temperatures as high as 275° C. and at atmospheric pressure.

The type and amount of catalyst employed in this invention may be varied considerably. It is preferred, however, to employ a nickel catalyst either in the massive state or supported on suitable materials such as kieselguhr, alumina, magnesia, etc. Such catalyst may be prepared by reducing nickel compounds such as nickel carbonate, oxide or hydroxide either alone or precipitated on suitable supporting materials; or nickel compounds such as nickel oxide, chloride, sulfate and others may be reduced to the metal by means of metallic sodium. Such catalysts may exist either wholly or in part in the reduced state and further reduction of the catalyst may occur during the hydrogenation process. In place of nickel other hydrogenation catalysts especially those of the ferrous metal group may be used. Moreover, operable catalysts include pure or mixed metals of this group which may or may not be combined with additional elements such as cadmium or chromium which act as promoters.

The process described herein may be carried out in the presence of inert solvents such as water, alcohols, ethers, or hydrocarbons. As examples of specific organic solvents that may be used are methanol, dioxane, toluene, etc. It is preferred, however, to carry out the reaction in the absence of solvents other than ammonia.

The quantity of hydrogen absorbed is the best indication of the progress of the hydrogenation and the reaction should be stopped when the amount required by the equation for the half hydrogenation of the dinitrile has been taken up. The consumption of hydrogen may be measured either by the drop in pressure, if the hydrogen supply is not directly connected to the autoclave or by metering the hydrogen consumed when the supply of hydrogen is directly connected to the autoclave.

An additional method of determining the end point of hydrogenation is to take samples of the mixture during hydrogenation. A determination of the neutralization equivalent of the mixture gives an accurate measure of the extent of hydrogenation. However, the data obtained may not be applicable until subsequent runs are made and considerable time is consumed in making determinations of neutralization numbers.

Preliminary tests may be made to obtain the proper time for half hydrogenation for a specific set of operating conditions. Modifications or combinations of the described methods of control are to be considered within the scope of this invention.

In the practice of this invention any aliphatic dinitrile containing at least 6 carbon atoms and in which the nitrile groups are separated by at least 4 carbon atoms may be used. For practical reasons, however, it is preferred to use aliphatic dinitriles containing from 6 to 20 carbon atoms and especially those containing from 6 to 12 carbon atoms. Specific dinitriles coming within the scope of this invention in addition to those of the examples are azelaonitrile, suberonitrile, beta-methyladiponitrile, beta-amyladiponitrile, brassylonitrile, 1,19-nonadecanedinitrile, 1,17-heptadecanenitrile, 1,9-dicyanononane, 1,10-dicyanodecane, and pimelonitrile.

Dinitriles containing less than 4 carbon atoms between the nitrile groups do not appear to be useful for this invention. Thus, nitriles of the type of succinonitrile yield cyclic amines such as pyrrolidine rather than the desired open chain aminonitrile.

The present invention offers a practical method for preparing the hitherto unknown class of products which may be called broadly acyclic-omega-monoaminonitriles. These materials are particularly useful as starting materials for organic synthesis, such as the preparation of the omega-amino acids, since they possess two highly reactive functional groups and offer attractive synthetic possibilities which would be apparent to any one skilled in the art.

The above description and specific examples are to be construed as illustrative only and not as limiting the scope of this invention. Any modifications or variations therefrom which conform to the invention are intended to be included in the scope of the claims.

I claim:

1. An acyclic monoaminonitrile in which the amino and nitrile groups are separated by a chain of at least 5 carbon atoms contiguous therewith.

2. An acyclic monoaminonitrile containing from 6 to 20 carbon atoms and in which the amino and nitrile groups are separated by a chain of at least 5 carbon atoms contiguous therewith.

3. An acyclic omega-monoaminonitrile containing from 6 to 12 carbon atoms and in which the amino and nitrile groups are separated by a chain of at least 5 carbon atoms contiguous therewith.

4. An acyclic omega-monoaminonitrile containing at least 6 carbon atoms in a straight chain and in which the amino and nitrile groups are separated by at least 5 carbon atoms in the chain.

5. Epsilon-aminocapronitrile.

6. Omega-aminocaprinitrile.

7. The process which comprises catalytically hydrogenating, at a temperature of 25° to 200° C.

in the presence of ammonia and in the liquid phase, an acyclic dinitrile in which the nitrile groups are separated by a chain of at least 4 carbon atoms contiguous therewith, and discontinuing the hydrogenation when an amount of hydrogen theoretically necessary for the conversion of at least a substantial portion of the dinitrile to aminonitrile has been absorbed.

8. The process which comprises catalytically hydrogenating, at a temperature of 90° to 130° C. in the presence of ammonia and in the liquid phase, an acyclic dinitrile containing from 6 to 20 carbon atoms and in which the dinitrile groups are separated by a chain of at least 4 carbon atoms contiguous therewith, and discontinuing the hydrogenation when an amount of hydrogen theoretically necessary for the conversion of at least a substantial portion of the dinitrile to the aminonitrile has been absorbed.

9. The process for the preparation of an omega-amino acid which comprises catalytically hydrogenating at a temperature of 25° to 200° C. in the presence of ammonia and in the liquid phase an omega-dinitrile in which the nitrile groups are separated by a chain of at least 4 carbon atoms contiguous therewith, discontinuing the hydrogenation when an amount of hydrogen theoretically necessary for the conversion of at least a substantial portion of the omega-dinitrile to the omega-aminonitrile has been absorbed and subsequently hydrolyzing said omega-aminonitrile to an omega-aminoacid.

GEORGE W. RIGBY.